_United States Patent_ [19]

Van den Brug

[11] Patent Number: 4,712,628

[45] Date of Patent: Dec. 15, 1987

[54] WEIGHING ELEMENT FOR A WEIGHING APPARATUS

[75] Inventor: Lippe Van den Brug, Groningen, Netherlands

[73] Assignee: U.S. Philips Corporation, New York, N.Y.

[21] Appl. No.: 4,795

[22] Filed: Jan. 6, 1987

Related U.S. Application Data

[63] Continuation of Ser. No. 728,721, Apr. 30, 1985.

[30] Foreign Application Priority Data

May 4, 1984 [NL] Netherlands ...................... 8401420

[51] Int. Cl.$^4$ .......................... G01G 3/14; G01G 3/08; G01L 1/22
[52] U.S. Cl. ................................. 177/211; 177/229; 73/862.65
[58] Field of Search .............................. 177/211, 229; 73/862.65

[56] References Cited

U.S. PATENT DOCUMENTS

| 3,554,025 | 1/1971 | Andersson et al. ............. 177/211 X |
| 4,291,776 | 9/1981 | Kupper et al. ....................... 177/229 |
| 4,396,079 | 8/1983 | Brendel ........................... 177/211 X |
| 4,453,609 | 6/1984 | Griffin et al. ....................... 177/211 |

FOREIGN PATENT DOCUMENTS 0141710 10/1984 European Pat. Off. ............ 177/211

Primary Examiner—George H. Miller, Jr.
Attorney, Agent, or Firm—Robert T. Mayer

[57] ABSTRACT

The invention relates to a weighing element for a weighing apparatus, comprising a plate-shaped bending element provided with strain-gauge transducers, one end of the bending element being secured to a frame of the weighing element and the free other end being secured to a resilient force-transmitting arm. In order to increase the accuracy of the weighing element it is proposed to make the bending element of a ceramic material and to support the bending element at a distance from each of said ends by the frame and by the arm, respectively.

6 Claims, 3 Drawing Figures

WEIGHING ELEMENT FOR A WEIGHING APPARATUS

This is a continuation of application Ser. No. 728,721, filed Apr. 30, 1985, abandoned.

BACKGROUND OF THE INVENTION

The invention relates to a weighing element for a weighing apparatus, comprising a plate-shaped bending element provided with strain-gauge transducers, one end of the bending element being secured to a frame of the weighing element and the free other end being connected to a resilient force-transmitting arm.

Such a weighing element is known from European Patent Application no. 0,052,257 to which U.S. Pat. No. 4,423,640 corresponds. A weighing element comprising a resilient force-transmitting arm has the advantage that one end portion of the bending element is subjected to positive and negative strain, so that the strain-gauge transducers can be arranged at one end of the bending element and the bridge circuit, which comprises the strain-gauge transducers, functions in an optimum manner.

Further, it is generally known to make bending elements of a ceramic material. For an example of this, see U.S. Pat. No. 4,311,980. Ceramic materials have the advantage that they are very sensitive to surface stress and can thus be very accurate, i.e. the material has a very high linearity and is substantially immune to creepage and hysteresis. However, these properties are influenced to a large extent by the manner in which the force is applied to the ceramic bending element and how the bending element is supported. Moreover, arranging strain-gauge transducers made of film resistors on a ceramic substrate is a cheap manufacturing method.

The invention aims at improving the accuracy of a weighing element of the type defined in the opening paragraph.

According to the invention the weighing element is characterized in that the bending element is made of a ceramic material and is supported by the frame at the one end, and the bending element supports the arm at a distance from the one end and at the other end, respectively.

Such a construction has the advantage that it results in a weighing element which yields highly linear measuring results, which is substantially immune to creepage and hysteresis, and which is nevertheless cheap to produce.

The ceramic bending element cannot readily be secured to the frame by means of, for example, a screw because the breaking stress of a ceramic material is rather low and because this may give rise to undesired surface stresses in the ceramic material, which may adversely affect the measuring results. In one embodiment of the invention, therefore, the ends of the bending element are secured to the frame and the arm respectively by means of an adhesive.

Another preferred embodiment is characterized in that the bending element is supported by a knife-edge support on the frame, and the arm is supported on the element by a knife-edge support.

Yet another embodiment is characterized in that the one end of the bending element is secured to and supported by the frame and the other end is secured to and supports the arm, respectively, so as to obtain a three-point support.

An embodiment of the invention will now be described in more detail, by way of example, with reference to the drawings.

DESCRIPTION OF THE PREFERRED EMBODIMENT

Figure 1:
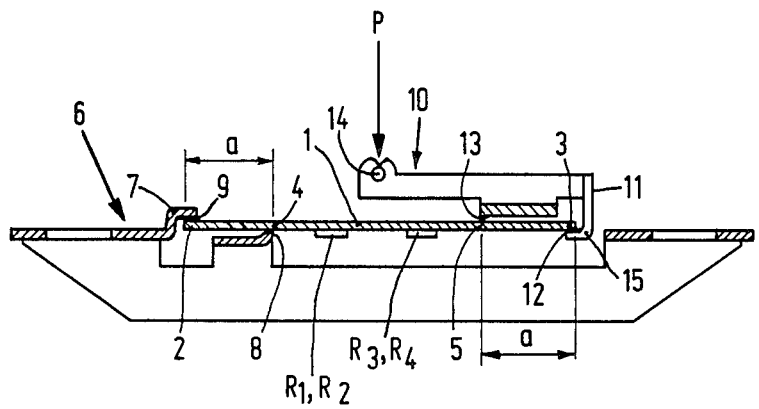
FIG. 1 is a longitudinal sectional view of the weighing element.
Figure 2:
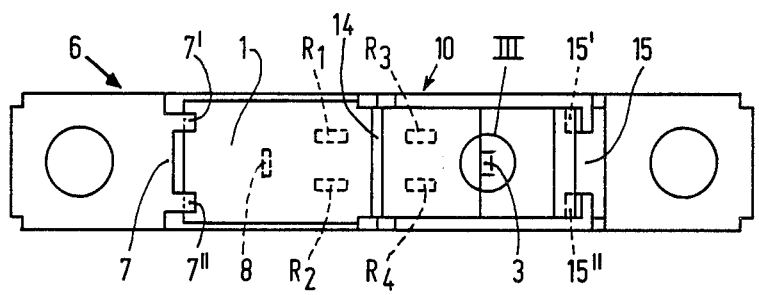
FIG. 2 is a plan view of the weighing element shown in FIG. 1.

The weighing element comprises a bending element 1 in the form of a rectangular ceramic plate, on one side of which four strain-gauge transducers comprising film resistors $R_1$, $R_2$, $R_3$ and $R_4$ are arranged. In known manner the resistors are arranged as a Wheatstone bridge in order to determine the resistance variation caused by the deformation of the bending element and hence the value of the bending force.

At one end 2 the bending element 1 is secured to a projecting tongue 7 of a U-shaped frame 6 by means of a curable adhesive 9, and at a point 4 spaced a distance a from its end 2 the bending element is supported by a projecting portion 8 of the frame.

In order to cause a bending force applied to the bending element to subject the element to bending moments which will produce both negative and positive strain at one end of the bending element, the bending force, P, is applied in such a way that a torque is produced in a portion of the bending element at the free other end 3 of the bending element. For this purpose the weighing element is provided with a resilient arm 10. One end 11 of the arm is secured to the free end 3 of the bending element by means of a curable adhesive 12. At a point 5 on its upper side located a distance (suitably equal to the distance a) from this free end 3 the bending element supports a projecting portion 13 of the arm. The arm 10 extends to substantially halfway along the bending element, where the force P acts on a pin 14 which is secured to the free end of the arm. In order to produce a torque, the end 11 of the arm is constructed as a hook 15 which engages the lower side of the bending element, so that reaction forces of the hook 15 and the support 13 act on opposite sides of the bending element. The bending element is secured to the frame and the arm mainly to ensure reliable support of the bending element and arm. Therefore, the layers of the adhesives 9 and 12 may be very thin. In fact the adhesive merely serves to prevent lateral displacements of the bending element relative to the frame and the arm, respectively. This minimizes possible adverse effects of the adhesive bonds on the accuracy.

Figure 3:
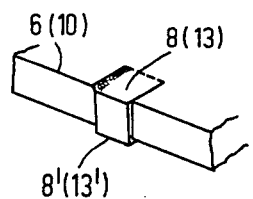
FIG. 3 shows the construction of the supports of the bending element on an enlarged scale.

The measuring results can be influenced favourably if the bending element is supported with a minimal free movement. This may be achieved if the points where the element is supported, namely point 2 where it is secured and point 4 where it is supported, together constitute a three-point support. The same applies to point 3 where it is secured and point 5 where it supports the arm. Indeed, a plate is supported in a well-defined manner by a three-point support. In theory, the best solution would therefore be to secure, support and apply torque to the element by point contacts. It is obvious that this is impracticable and would give rise to problems as a result of the low breaking stress of the ceramic material. Therefore, a compromise has been achieved by the use of short knife-edge supports constituted by the edges 8' and 13', respectively, (see FIG. 3) of the projecting portions 8 and 13, respectively, and the two small contact areas 7' and 7" of the tongue 7 and 15' and 15" of the hook 15 at each of the ends 2 and 3, respectively, of the bending element. The small contact areas of the tongue and the hook are secured to the bending element by an adhesive. The supports 8 and 13 are obtained by locally embossing the frame and the arm, respectively, the edges 8' and 13' of the embossed portions being positioned against the bending element. (FIG. 3).

What is claimed is:

1. A weighing element for a weighing apparatus, said element comprising a frame; a bending element having one end and a top and bottom surface and strain-gauge transducers mounted thereon, said bending element having its top surface secured to said frame at said one end, said bending element having a free end; and a resilient force-transmitting arm with a first end secured to the bottom surface of said free end of said bending element, said bending element being made of a ceramic material and being supported on its bottom surface by said frame at a distance from said one end, the top surface of said bending element supporting said force-transmitting arm at a distance from said free end of said bending element; and pin means on said force-transmitting means through which forces are applied to said force transmitting arm, said pin means being located relative to the location of said supports for said bending element and said force-transmitting arm and said supports being located on the top and bottom of said bending element such that forces applied to said pin causes forces to be applied to said bending element at said supports which are opposite to the forces applied to said bending elements at its ends.

2. An element as claimed in claim 1, characterized in that said ends of the bending element are secured to the frame and to the arm respectively by an adhesive.

3. An element as claimed in claim 2, characterized by comprising a knife-edge support fixed to the frame and a knife-edge support fixed to the arm, for respectively supporting said bending element and said arm.

4. An element as claimed in claim 3, characterized in that said one end of the bending element is secured to the frame at two spaced locations, and the free end of the bending element is secured to the arm at two spaced locations, the respective securing locations and knife-edge supports each forming a three-point support.

5. An element as claimed in claim 1, characterized in that said one end of the bending element is secured to and supported by the frame, and the free end of the being element is secured to and supports the arm, by respective means for securing and supporting, each said means comprising a three-point support.

6. An element as claimed in claim 1, characterized by comprising a knife-edge support fixed to the frame and a knife-edge support fixed to the arm, for respectively supporting said bending element and said arm.

* * * * *